No. 777,273. PATENTED DEC. 13, 1904.
A. E. CATTERMOLE.
SEPARATION OF THE METALLIC CONSTITUENTS OF ORES FROM GANGUE.
APPLICATION FILED SEPT. 28, 1903.
NO MODEL.
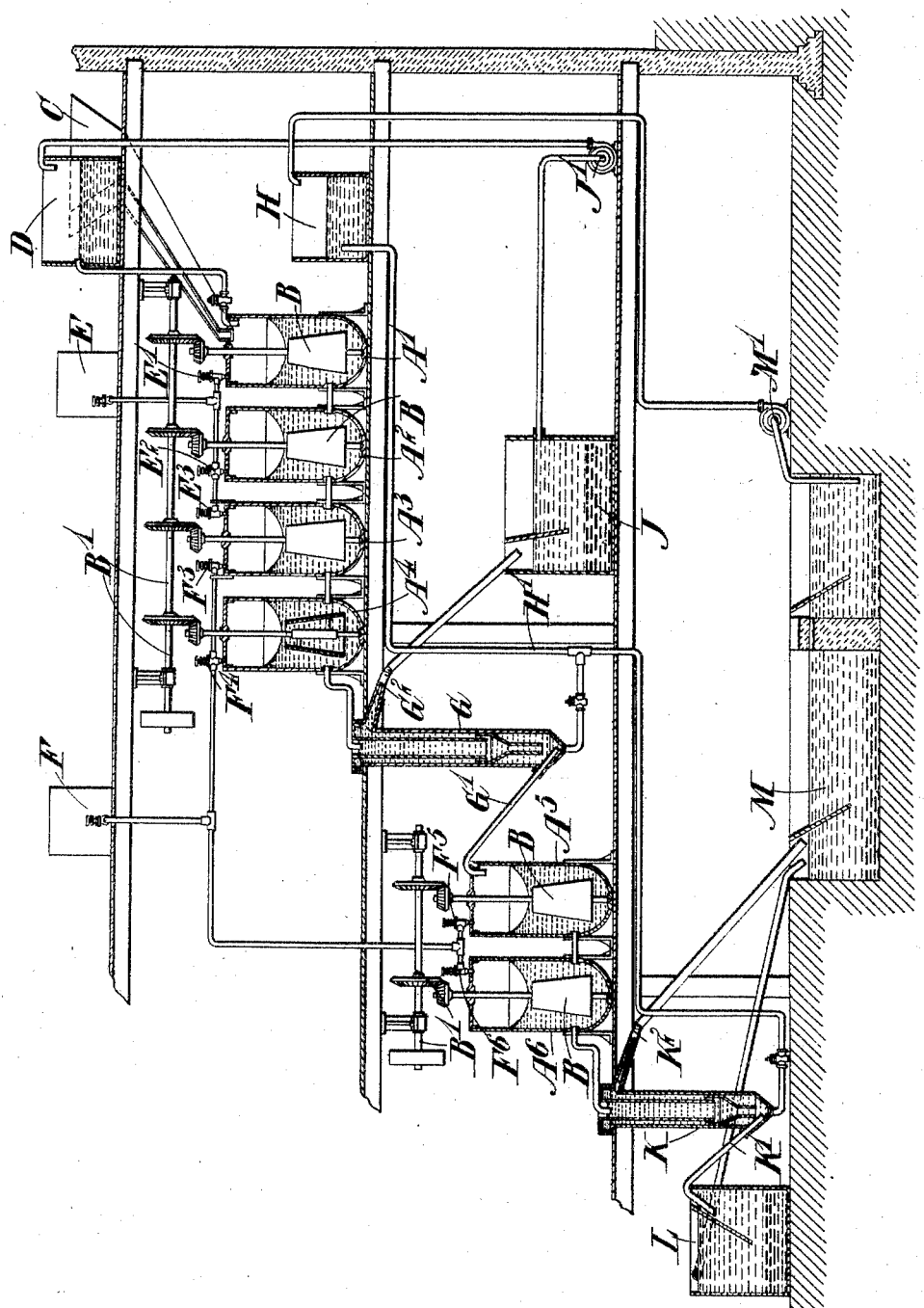

No. 777,273.

Patented December 13, 1904.

UNITED STATES PATENT OFFICE.

ARTHUR EDWARD CATTERMOLE, OF LONDON, ENGLAND.

SEPARATION OF THE METALLIC CONSTITUENTS OF ORES FROM GANGUE.

SPECIFICATION forming part of Letters Patent No. 777,273, dated December 13, 1904.

Application filed September 28, 1903. Serial No. 174,947. (No specimens.)

*To all whom it may concern:*

Be it known that I, ARTHUR EDWARD CATTERMOLE, a subject of the King of England, residing at Highgate, London, England, have invented certain new and useful Improvements in the Separation of the Metallic Constituents of Ores from Gangue, of which the following is a specification.

The present invention relates to improvements in the separation of the metalliferous constituents of ores and the like from gangue by means of the selective action of oils and certain tar products or similar compounds (all hereinafter referred to as "oil") on metallic or metalliferous matter.

The invention depends upon the application of the following facts: First, when a mixture of powered metalliferous matter and gangue is treated with oil suspended in water—that is to say, in emulsion—the oil has a more or less selective action and will coat the particles of metalliferous matter in preference to the particles of gangue, while the particles of gangue will be wetted by the water; second, if the water which is mixed with the oil is acidulated with mineral, fatty, or other acid the selective action of the oil will thereby be rendered more marked and decisive; third, if the proportion of oil is kept within reasonably low limits (differing in different cases, according to the nature of the mineral to be treated and the consistency and nature of the oil) and if the mixture of water, oil, metalliferous particles, and gangue be thoroughly agitated the metalliferous particles which have become coated with oil will adhere together and form granules, which granules, partly by reason of gravity or partly on account of their bulk, as compared with the individual grains of gangue, will offer ready means for separation in an up-current separator, a jig, or other similar appliance. This action is facilitated if the oil before addition to the liquor is brought into the condition of an emulsion in water containing a small percentage of soap or other emulsifying agent. These facts are utilized for the purpose of separating the metalliferous constituents from the gangue of the ore in the following manner: In a suitable apparatus, an example of which will be hereinafter described, the ground or pulped ore is caused to be violently agitated, as by a revolving stirrer, in a mixture of water and oil, the liquor being acid. As the agitation proceeds the particles of metalliferous matter agglomerate together and may be observed in the form of granules, the size of which will depend, among other things, upon the percentage of oil used. This granulation of the metalliferous constituents of the ore affords the means by which at a later stage of the process it is possible to separate the metalliferous material from the gangue, as will be hereinafter particularly described. In practice a continuous process is used—that is to say, water, ground ore, or pulp and oil, preferably emulsified, are continuously fed into a series of vessels, and the products of the agitation are continuously fed into an up-current separator or jig or similar device, which in the case of the up-current separator separates the metalliferous granules from the gangue by allowing them to fall to the bottom of the vessel and to be carried away by a downward stream, while the particles of gangue are carried away by an upward steam.

The accompanying drawing is a diagram illustrating in sectional view one means of carrying out the process according to this invention, in which the liquid mass is brought into an acid condition.

A series of connected mixing vessels $A'$ $A^2$ $A^3$ $A^4$ $A^5$ $A^6$ are provided with stirrers B, rotated from driving-shafts $B'$. Crushed ore from a hopper C and water from a tank D are introduced into the first vessel, $A'$, and oil or emulsion is fed from a tank E, through pipes $E'$ $E^2$ $E^3$, to the various vessels. The mixture is vigorously agitated to break up and emulsify the oil and to bring about intimate contact of the divided oil with the metalliferous mineral particles and of the oiled particles with each other. It is found under these conditions the metalliferous mineral particles abstract the oil and become coated with a thin oily film, which is insufficient to materially lessen their specific gravity, and that under agitation such slightly-oiled particles adhere, nucleate, and agglomerate into small more or less rounded masses or granules disseminated throughout the mass of gangue, which remains free and practically devoid of oil. In order to maintain the liquid mass in which the separation is effected in an acid condition, a small proportion of the sulfuric or other acid is introduced into one or more of the vessels from a tank F, having discharge-pipes $F^3$ $F^4$ $F^5$ $F^6$. After agitation to a certain extent (in four vessels, as illustrated, for example) the mixture is passed into an up-current classifier G, which is supplied with a stream of acidulated water from a tank H through a pipe H'. As the granules remain specifically heavier than the gangue or can by suitably adjusting the amount or oil and the agitation be obtained of a size larger than that of the gangue particles, the granules, with a certain amount of heavy sands, sink to the bottom and are discharged through a pipe G' into the vessel $A^5$, while the lighter sands are carried away by the upward current and discharged through outlet $G^2$ to a light-sands tank J, from which the water may be returned by a pump J' to the feed-tank D for reuse. In order to separate the granules from the heavy sands, the mixture is subjected to further agitation in the vessels $A^5$ $A^6$ and is then passed into a second classifier K, from which the granules are removed at the bottom by the pipe K' into the metalliferous-mineral tank L, while the heavy sands are discharged from the upper pipe $K^2$ into a heavy-sands tank M. The water from the tanks L and M is returned by a pump N' to the feed-water tank H. This apparatus is illustrated only as one convenient method of carrying out this invention, and it is to be understood that its nature and arrangement can be considerably varied. Thus the acid condition may be obtained by acidulating the ore-pulp before agitation with the oil or oil emulsion, or the ore-pulp may be first agitated with emulsion to slightly agglomerate the ore, which may be settled and washed and the product then treated by agitation with acid solution to granulate the mineral and free the gangue. Which of the methods is most applicable depends upon the nature of the mineral matter and of the gangue, their state of division, and relative proportions. The agitation vessels may be separate, with arrangements for charging and discharging, the charging with pulp and the addition of acid and of oil or emulsified oil and the agitation and discharge successively in the series of vessels being so timed that the output of treated ore is kept continuous and constant. The classifiers used may be jigs, shaking-tables or the like, or sizing apparatus, whereby the comparatively larger mineral granules may be separated from the finer gangue and one or more classifiers may be employed.

The proportion of oil used depends upon its viscosity, the fineness of the ore and other factors, and the consistency and size of the mineral granules desired. The more oil used the larger, softer, and less numerous the granules. With, say, ten per cent. of oil to the weight of metalliferous mineral a few pasty masses of oil-agglomerated metalliferous mineral matter will generally result. Oil in excess of this may cause all the granules to coalese into one soft mass. Usually an amount of oil varying from four per cent. to six per cent. of the weight of metalliferous mineral matter present in the ore yields granules of suitable size, consistency, and specific gravity for ready separation from the gangue in the up-current or other apparatus used for classification.

The amount of emulsifying agent if used to form the oil emulsion depends upon the vicosity and nature of the oil. When soap is employed, an amount varying from three per cent. to five per cent. of the weight of oil usually suffices, this being dissolved in, say, ten times its weight of water. For emulsification a low alkalinity of the emulsifying agent is generally best.

The "oil" used may be animal, vegetable, or mineral oil or mixtures of these or such coal or wood tar products or other substances which exercise, like oils, a preferential physical affinity for metallic mineral matter as distinguished from gangue. The emulsifying agent (if such is used) may be any substance capable of holding the oil in a fine state of division in suspension in water without acting on the mineral matter or preventing the action of the oil—for example, soap, alkaline cresylates, or other substances, solutions of which in water froth on agitation. The emulsifying agent, or the constituents liberated therefrom under the action of acid, appears to have a decided effect in aiding the granulation, as described. In some cases, as with wood-tar and some coal-tar products, these when agitated in weak alkaline solutions provide their own emulsifying agents, soluble resinates, cresylates, &c., being thereby formed which emulsify the bulk of the tar or product. In this process the amount of emulsifying agent employed is kept as low as possible compatible with the proper subdivision of the oil to prevent undue waste of the alkaline or basic constituent present, which is necessarily destroyed in the acid solution used. When soap is used, the fatty acid becomes associated with the mineral granules and can be subsequently recovered. Emulsification in some cases, as with the heavier residuum oils or tars, may be assisted by first mixing therewith a small amount of fatty oil or fatty acid. Preferably one emulsifying agent is employed throughout the process.

In order to recover the oil from the granules after their separation from the gangue, they may be agitated with the emulsifying agent in a stronger or more active condition or proportion than was used in the emulsification of the oils initially, and the action of this emulsifying agent in stripping the oil from the metalliferous mineral particles may be aided by attrition. The strengthening of the emulsifying agent may be effected by increasing the proportion of the agent or of the alkaline base in solution, or both, the percentage strength of the solution needed depending upon the oil used and the nature of the metalliferous mineral matter with which it is associated. Usually if oleic soap is employed and caustic potash amounts varying from one-quarter of one per cent. to three per cent. or four per cent. of one or the other in solution suffice, the less readily emulsified oils, as the residuum oils, requiring the larger amounts. The removed oil is obtained as a dilute emulsion, which on standing some time separates. The cream or concentrated emulsion may then be used for making fresh emulsion for treating fresh ore. To hasten this separation of "cream," mechanical devices may be employed.

Generally with wet crushed ore removal of the bulk of the water for reuse in the mill is necessary. In such case the pulp is settled and the wet ore only fed into the agitators, acid-water being added to thin them. The circuit of such liquids can thus be kept distinct from that of the mill-water, suitable arrangements being made for settling the mineral-depleted sands and slime and for addition of acid and fresh water, as required from time to time.

In certain cases, as where but little mineral is present in the ore, to increase the nucleating or granulating factor pulverized mineral matter obtained in a previous operation or other matter having an affinity for oil from a different source may be introduced into the ore, or a portion of already granulated and separated mineral matter may be returned to maintain the necessary amount of mineral in the ore under treatment.

In carrying out the process the ore may be roughly sized into two or more parts, which are then treated separately. With certain ores it may be preferable to use in some stages of the process a rolling form of agitation, as in cylinders or barrels, to obtain good granulation of the mineral.

It has been found that if the water in which the operation is conducted contains a percentage of acid, varying in the case of sulfuric acid of 1.84 specific gravity from one-half of one per cent. to a tenth of one per cent., the operation is greatly facilitated. Indeed, if there is no acid present there is a great tendency for the oil to coat the gangue or some portion of the gangue, as well as the metalliferous particles. It is preferable to use water acidulated with about one-fifth of one per cent. of this acid, and it is found in practice that such a degree of acidulation is sufficient completely to prevent the gangue from being oiled, while it is not, generally speaking, enough to cause the water to act chemically upon the metalliferous matter.

I am aware that the selective action of oils and the like on metallic matter has been made the basis of previous processes for separating the metalliferous constituents of ores from gangue. For example, oil has been used to float off metalliferous mineral from ore-pulp, and its use has also been proposed to form a pasty mass of crushed ore from which the gangue could afterward be washed out by means of water, and I do not claim the employment of oil in any such manner.

What I claim as my invention, and desire to secure by Letters Patent, is—

1. The herein-described process of separating metalliferous matter from gangue which consists in mixing the pulp with an amount of oil equaling only a fraction of the metalliferous constituents, agitating the mass until the oil-coated metalliferous matter is agglomerated into granules and subjecting the mixture to classification to remove the small non-coated particles from the granules.

2. The herein-described process of separating metalliferous matter from gangue which consists in mixing the ore with an emulsion containing an amount of oil equaling only a fraction of the metalliferous constituents agitating the mass until the oil-coated metalliferous matter is agglomerated into granules and subjecting the mixture to classification to remove the small non-coated particles from the granules.

3. The herein-described process of separating metalliferous matter from gangue which consists in mixing the ore with an emulsion containing an amount of oil equaling only a fraction of the metalliferous constituents and an acid, agitating the mass until the oil-coated metalliferous matter is agglomerated into granules and subjecting the mixture to classification to remove the small non-coated particles from the granules.

4. The herein-described process of separating metalliferous matter from gangue which consists in mixing the ore with an emulsion containing an amount of oil equaling only a fraction of the metalliferous constituents and an acid, agitating the mass until the oil-coated metalliferous matter is agglomerated into granules and subjecting the mixture to up-current classification to remove the small non-coated particles from the granules.

5. The herein-described process of separating metalliferous matter from gangue which consists in mixing the ore with an emulsion containing an amount of oil equaling only a fraction of the metalliferous constituents and an acid, agitating the mass until the oil-coated metalliferous matter is agglomerated into granules and separating out the light sands, thereafter further agitating the mass to increase the size of the granules and separating out the heavy sands from the granules.

6. The herein-described process of separating metalliferous matter from gangue which consists in agitating a mixture of powdered ore, oil emulsion and water containing an acid and adding particles of material having an affinity for oil to assist in the formation of granules of oil-coated particles and subjecting the mixture to a classification to remove the small non-coated particles from the granules.

7. The herein-described process of separating metalliferous matter from gangue which consists in agitating a mixture of powdered ore, oil emulsion and water containing an acid and adding particles of material having an affinity for oil to assist in the formation of granules of oil-coated particles and subjecting the mixture to classification to remove the small non-coated particles from the granules.

In testimony whereof I have signed my name to this specification in the presence of two subscribing witnesses.

ARTHUR EDWARD CATTERMOLE.

Witnesses:
 HAROLD WADE,
 HARRY B. BRIDGE.